United States Patent [19]
Herrmann

[11] 3,781,910
[45] Dec. 25, 1973

[54] INFRARED ABSORPTION ANALYSIS METHOD AND APPARATUS FOR DETERMINING GAS CONCENTRATION

[75] Inventor: Pierre Herrmann, Fontenay-aux-Roses, France

[73] Assignee: Compteurs Schlumberger, Montrouge, France

[22] Filed: Sept. 22, 1972

[21] Appl. No.: 291,379

[30] Foreign Application Priority Data
Sept. 28, 1971  France .............................. 7134767

[52] U.S. Cl. .............................. 250/341, 250/343
[51] Int. Cl. ............................................. G01n 21/34
[58] Field of Search ............................... 250/43.5 R

[56] References Cited
UNITED STATES PATENTS

| | | | |
|---|---|---|---|
| 2,721,942 | 10/1955 | Friel et al. ......................... | 250/43.5 |
| 2,688,090 | 8/1954 | Woodhull et al. ................. | 250/43.5 |
| 3,072,787 | 1/1963 | Moyat ................................ | 250/43.5 |
| 2,534,657 | 12/1950 | Bray ................................... | 250/43.5 |
| 2,621,297 | 12/1952 | Obermaier ......................... | 250/43.5 |
| 2,674,696 | 4/1954 | Smith et al. ....................... | 250/43.5 |
| 2,697,789 | 12/1954 | Skarstrom ......................... | 250/43.5 |
| 2,934,646 | 4/1960 | Parsons ............................. | 250/43.5 |
| 3,539,804 | 11/1970 | Billetdeaux et al. .............. | 250/43.5 |

*Primary Examiner*—William F. Lindquist
*Attorney*—William R. Sherman et al.

[57] ABSTRACT

There is disclosed a dual beam gas analyzer and the mode of operation thereof for measuring small concentrations of a gas of interest in the presence of another gas having absorption bands overlapping those of the gas of interest. This is encountered in the determination of the concentration of $CO_2$, CO, $CH_4$, $C_2H_2$, $NH_3$ or $SO_2$ in the presence of $CH_4$, $CO_2$, $CO_2$, $CO_2$ or $CH_4$ respectively. The dual beam gas analyzer comprises a source of infrared rays providing an infrared beam which is directed into one end of an analysis chamber through an optical commutator. The optical commutator directs alternately and periodically the infrared beam to a comparison filter transparent to the infrared beam and to a gaseous filter absorbing completely the energies of the absorption bands of the gas to be measured. The output signals of a non-selective radiation detector disposed at the other end of the analysis chamber are applied to electronic circuits which provide a signal representative of the difference between the energies of the two successive beams passing through the analysis chamber. A movable shutter permits one to modify the energy of the beam corresponding to the comparison filter and is adjusted to eliminate the influence of the other gas on the determination of the concentration of the gas of interest. According to one embodiment an auxiliary tube is placed along the path of the beam passing through the gaseous filter to increase the precision of the gas analyzer in cases where the concentrations to be measured are in the range of a few tens ppm.

3 Claims, 7 Drawing Figures

INFRARED ABSORPTION ANALYSIS METHOD AND APPARATUS FOR DETERMINING GAS CONCENTRATION

BACKGROUND OF THE INVENTION

This invention relates to gas analyzers of the infrared absorption type for determining the concentration of a constituent of a gaseous mixture.

Many types of infrared gas analyzers are known and one of them is for example disclosed in U.S. Pat. No. 2,697,789. As there disclosed, the determination of one constituent in a mixture of infrared absorption constituents is conducted by employing a dual beam infrared analytical instrument. In this instrument, one of two beams of infrared energy is passed through a sample cell and through a "filter cell" to impinge on a radiation detector. The other of the two beams of radiation is passed through the same sample cell and through a "compensator cell" to impinge on a second radiation detector. By placing constituents in the "filter" and "compensator" cells which are particularly selected in regard to their radiation absorbing characteristics, and by critically adjusting the intensity of the radiation in the two beams referred to, independently of absorption occurring on passage through the cells, it is possible to "sensitize" the instrument for the detection of a desired constituent. Variations in the proportion of this constituent in mixtures admitted to the sample cell will then cause a differential voltage to be developed by the two detectors proportional to the concentration of this constituent. The initial adjustment of the intensity of the radiation in the two beams is obtained by moving a shutter into and out of the path of the beams.

When the constituents of the gaseous mixture to be analyzed are relatively non-interfering gases, the filter cell also called gaseous filter is filled with the gas to be measured and the compensator cell also called comparison cell is filled with nitrogen. The position of the shutter is then adjusted to cause the instrument to respond with the same signal for each of the absorbing gases other than the gas to be measured passing through the sample cell.

As pointed out in the above referred to patent, it is not possible to locate a point of minimum interference by the adjustment of the shutter alone in cases where the gases of a mixture have similar absorption spectra, such as hydrocarbon gases of the same series. However, an adjustment can be found if the compensator or comparison cell is filled with a suitable proportion of the absorbing gases other than the gas to be measured.

SUMMARY OF THE INVENTION

The present invention resides in the discovery that the process hereabove described in relation with non-interfering gases can be used for precisely measuring small concentrations of a gas in the presence of another gas that has absorption bands overlapping those of the gas to be measured. This is encountered in the determination of the concentration of $CO_2$ in the presence of $CH_4$ or water vapor, or of the concentration of CO in the presence of $CO_2$, or of the concentration of $CH_4$ in the presence of $CO_2$, or of the concentration of $C_2H_2$ in the presence of $CO_2$, or of the concentration of $NH_3$ in the presence of CO, or of the concentration of $SO_2$ in the presence of $CH_4$.

The present invention resides also in the insertion along the path of the beam passing through the filter cell of an auxiliary tube filled with a non-absorbing infrared gas. The auxiliary tube directs toward the radiation detector a beam which is not attenuated by the sample cell. This additional energy decreases the differential signal provided by the radiation detectors and consequently increases the precision of the measurement when the concentrations to be measured are very low.

Other particular embodiments for implementing a dual beam analyzer with critical adjustment of the beam passing through the gaseous filter are also described.

The signal S at the output of the radiation detector can be expressed as:

$$S = T_1 - T_2$$

with $T_1$ being the signal corresponding to the channel including the gaseous filter and $T_2$ being the signal corresponding to the channel including the comparison filter.

In the presence of the gas M to be measured in the analysis chamber, the output signal of the detector becomes:

$$S = T_1(1 - x_M U_M) - T_2(1 - B_M U_M)$$

in which $x_M$ and $B_M$ are the apparent absorption coefficients due to the gas M on the signal $T_1$ and on the signal $T_2$, respectively, and $U_M$ the amount of gas M in the analysis chamber.

Likewise, in the presence of the parasitic gas P in the analysis chamber the signal S is expressed as:

$$S = T_1(1 - x_P U_P) - T_2(1 - B_P U_P)$$

in which $x_P$ and $B_P$ are the apparent absorption coefficients due to the gas P on the signal $T_1$ and on the signal $T_2$, respectively, and $U_P$ the amount of gas P in the analysis chamber.

In the absence of the gas M, the signal S will not be affected by the gas P if:

$$T_1 - T_2 = T_1(1 - x_P U_P) - T_2(1 - B_P U_P)$$

hence $$T_2 = T_1(x_P/B_P) \tag{1}$$

i.e., the beam of the comparison channel must be attenuated so that the signal therefrom is equal to $T_1$ multiplied by the ratio $x_P/B_P$ which does not depend on the amount of gas P.

It can be shown that, with acceptable approximations, the relationship (1) remains valid during the simultaneous presence of gases M and P as long as absorption follows a linear law, the signal S being expressed as:

$$S = T_1(1 - x_M U_M)(1 - x_P U_P) - T_2(1 - B_M U_M)(1 - B_P U_P)$$

The adjustment of the energy of the beam of the comparison channel is appropriate only for one parasitic gas, since the ratio $x_P/B_P$ is variable from one gas to another, but is usually acceptable when several parasitic gases are simultaneously present since in most cases only one troublesome parasitic gas is encountered, the others being present in smaller amounts.

BRIEF DESCRIPTION OF THE DRAWINGS

In order that the manner in which the foregoing and the other objects are attained in accordance with the invention can be understood in detail, advantageous embodiments thereof will be described with reference to the accompanying drawings, which form a part of this specification and wherein.

DETAILED DESCRIPTION OF AN ILLUSTRATIVE EMBODIMENT

Figure 1:
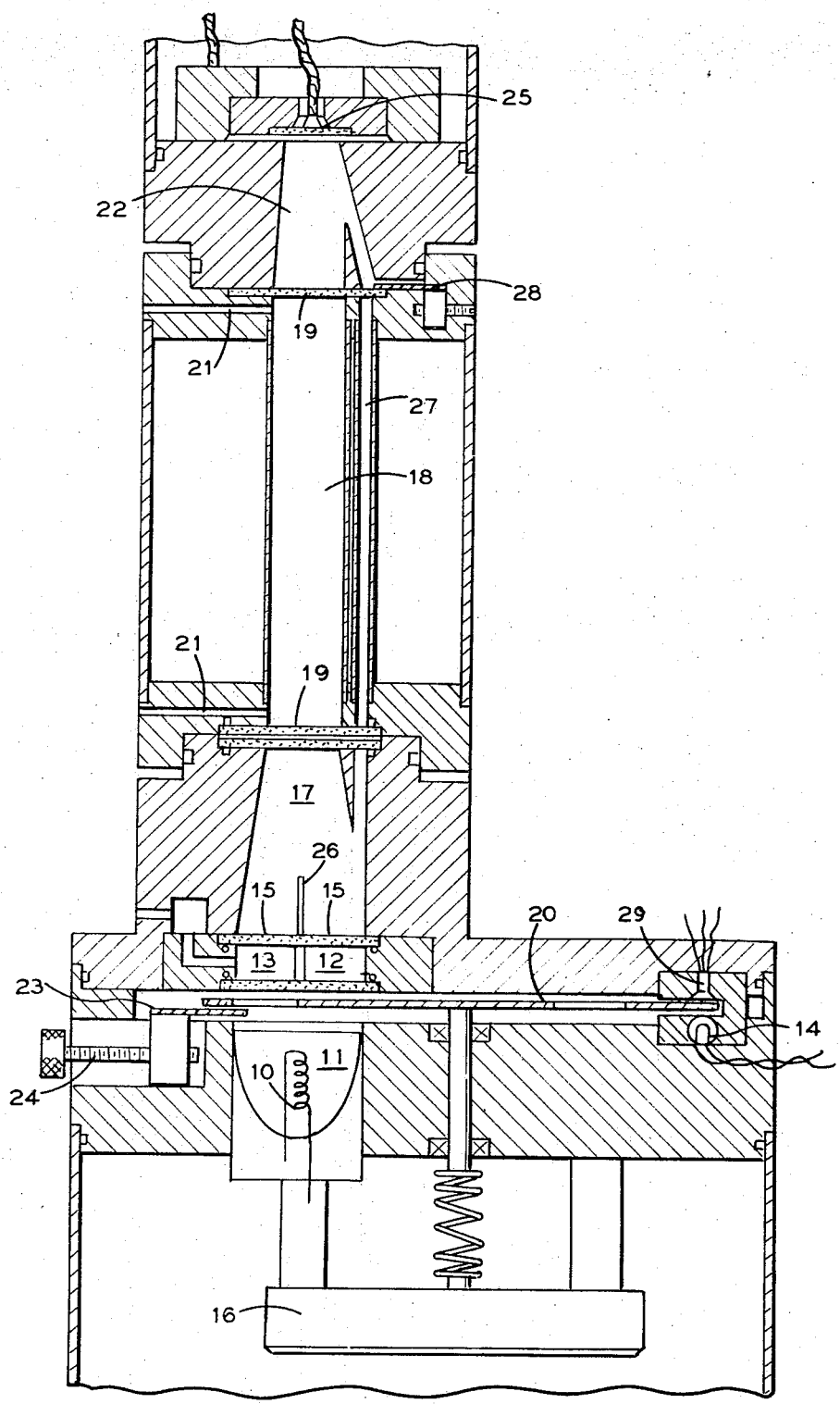
FIG. 1 is a sectional view of a gas analyzer of the infrared absorption type according to the present invention.

In FIG. 1, a source of infrared rays 10 comprised, for example, of a nickel-chromium filament heated up to 900°C by an electric current flowing therethrough, is placed at the focal point of a parabolic mirror 11.

Figure 2:
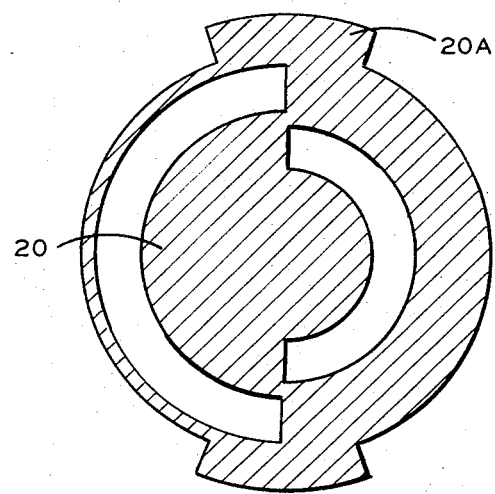
FIG. 2 is a plan view of an optical commutator according to the present invention.

Two filters 12 and 13 comprised of two cells filled with appropriate gas and having a thickness of about 0.2 inch are symmetrically arranged about the axis of the parabolic mirror 11. The gaseous filter 12, in a first channel, is filled with the gas to be measured in such an amount as to completely absorb the energies at the wavelengths of the absorption bands. The comparison filter 13, in a second channel, is filled with an inert gas such as nitrogen. These cells are closed at each end by windows 15 which are transparent to infrared radiation, for example, made of calcium fluoride. A rotating commutator comprised of a suitably perforated disk 20, a plan view of which is shown in FIG. 2, is disposed between the infrared source 10 and the filters 12, 13. The disk 20 is driven by an electrical motor 16 and, as a result, the infrared beam is alternately and periodically directed into the filters 12 and 13. An optical system 17 is used to direct each of the two beams issued from the filters 12 and 13 into one end of an axially disposed analysis chamber 18. The analysis chamber 18, when of cylindrical shape, has a diameter of about one half of an inch; its length ranging from a few mils to a few inches, is chosen according to the concentration of gas to be measured. This chamber is sealingly closed at its ends by windows 19, transparent to infrared radiation, and is traversed by the gas mixture to be analyzed which flows through inlets and outlets 21.

An optical system 22 directs the beams from the top end of the analysis chamber into a radiation detector 25 sensitive to infrared radiation, but non-selective and which, in this illustrative embodiment, is of the pyroelectric type.

An attenuation device such as a shutter or trimmer 23, partially or totally opaque to infrared radiation, is inserted in the second channel and placed upstream of the commutator 20. A screw 24 threadedly connected to the shutter 23 permits one to move the shutter into and out of the path of the infrared beam so as to attenuate or increase the energy of the beam transmitted in the second channel. The shutter 23 can alternatively be disposed between the commutator 20 and the filter 13, or even at the exit of the filter 13.

According to one feature of the present invention, the gas analyzer can optionally comprise, when it is intended for the analysis of gas mixtures with very low-concentration gases, a narrow tube 27 mounted parallel to the axis of the analysis chamber 18 and filled with an inert gas. This auxiliary tube 27 is placed in the first channel so as to be traversed only by the beam passing through the gaseous filter 12. This can be achieved by radially offsetting the tube 27 outward and/or by placing an axial screen 26 at the base of the optical system 17 so as to prevent the rays passing through the filter 13 from reaching the inlet of the auxiliary tube 27. A movable shutter 28 permits one to adjust the infrared energy passing through the auxiliary tube 27.

The analysis chamber 18 and optionally the auxiliary tube 27 are mounted in a metallic housing provided with clamps at its ends so as to permit easy assembling with the other elements of the apparatus.

Figure 3:
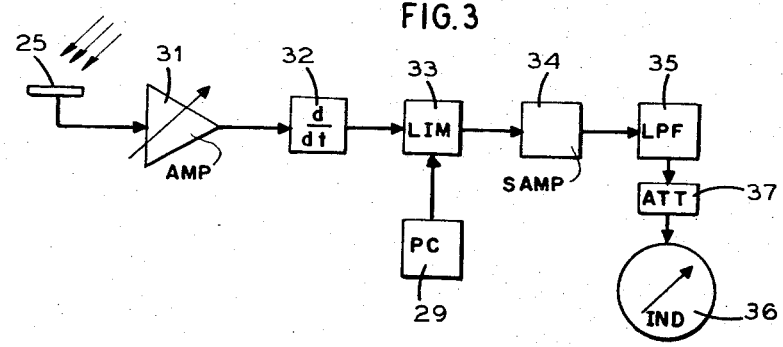
FIG. 3 illustrates the electronic circuits associated with the radiation detector of the gas analyzer of the infrared absorption type according to the invention.

The radiation detector 25 is electrically connected to an electronic signal processing system including, in cascade, the following circuits shown in FIG. 3, namely, a variable gain amplifier 31, a derivative circuit 32, an inhibition or limiting circuit 33 controlled by the signal provided by a photocell 29 a sampling circuit 34, a lowpass filter 35 and an indicator 36. A circuit 37 for attenuating the d.c. component has been connected between the lowpass filter 35 and the indicator 36 but could be placed at any other place in the chain.

Figure 4:
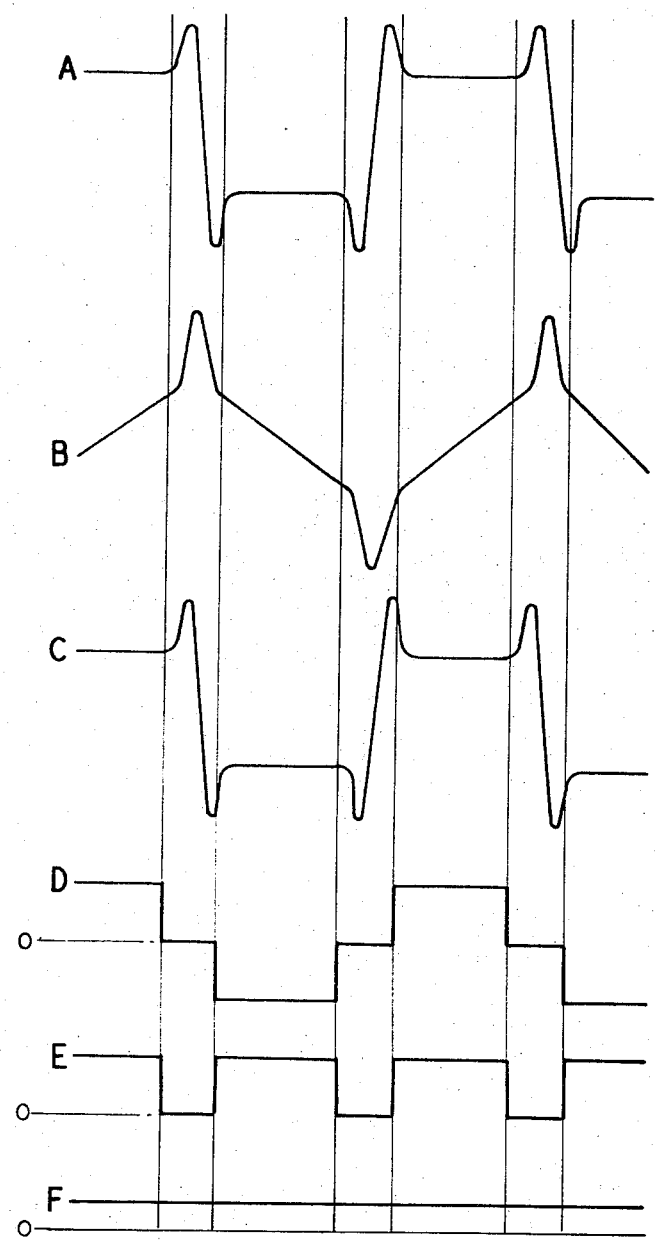
FIG. 4 shows, as a function of time, the diagrams of the energy received by the detector as well as the corresponding signals provided by the radiation detector and the circuits constituting the electronic processing system.

As the pyroelectric radiation detector 25 presents a response of the thermal type, it is necessary to reshape its signal by derivation. FIG. 4 shows, as a function of time, the diagrams of the energy received by the detector as well as the corresponding signals provided by the radiation detector 25 and the circuits 31 to 35 constituting the electronic processing system. FIG. 4A illustrates the curve of the energy received by the radiation detector 25. The curve shows two series of plateaus, each corresponding to a channel, separated by transition peaks due to edge effects in the optical commutator. The radiation detector 25 performs an integration so that its output signal has the shape illustrated in FIG. 4B. After amplification and derivation in the circuits 31 and 32, respectively, the signal has the shape illustrated in FIG. 4C, similar to that illustrated in FIG. 4A. To eliminate the peaks, the signal is held at the levels of the plateaus by the inhibition circuit 33. This holding is controlled by a timing signal generated by a photocell 29 disposed on one side of the disk 20 while a lamp 14 is disposed on the other side. The disk 20 has peripheral sectors 20a as shown in FIG. 2 which interrupt the light beam of the lamp 14 twice per revolution.

The output signal of the circuit 33 has the shape illustrated in FIG. 4D and is sampled and inverted in a circuit 34 to obtain the signal illustrated in FIG. 4E which, after filtering in the lowpass filter 35, has the shape of a d.c. signal illustrated in FIG. 4F. The circuit 37 can be in the nature of a potentiometer circuit and is designed to move the level of the d.c. signal so that the output signal read on the indicator 36 will be zero when the analysis chamber is empty.

The mode of operation of the gas analyzer is as follows:

the infrared beam from the source 10 is alternately directed via the commutator 20 into each of the two channels comprising the gaseous filter 12 and the comparison filter 13, respectively. Each beam then goes through the analysis chamber 18 before impinging on the radiation detector 25.

In the absence of a gas in the analysis chamber or in the presence of an inert gas, the infrared beam radiation is attenuated only by the gas to be measured contained in the gaseous filter 12. The detector 25 delivers an alternating signal modulated at the commutation frequency, i.e., at 25 Hz if the speed of the motor 16 driving the commutator 20 is 1,500 rpm. This signal has, for example, a magnitude of 2.5 mV as read on the indicator 36 which is representative of a zero concentration of the gas to be measured.

The gas to be measured and the parasitic gas have a common absorption band B which absorbs a part $kbE$ of the total energy E of the beam when the gas to be measured has a concentration $k$ and a part $mbE$ when the parasitic gas has a concentration $m$. It will be noted that $bE$ is the maximum energy which can be absorbed by the gas to be measured the parasitic gas and that $cE$ is the maximum absorbable by the parasitic gas alone. The partial energies absorbed by the other absorption bands are $kaE$ for the gas to be measured and $mcE$ for the parasitic gas.

When the analysis chamber is empty or filled with an inert gas, such as nitrogen, the signals $T_1$, $T_2$ and S are expressed as:

$T_{1N} = K(1 - a - b)E$
$T_{2N} = KsE$
$S_N = K(1 - a - b - s)E$ if $sE$ is the energy of the beam passing through the shutter 23 and K the coefficient of sensitivity of the radiation detector 25 and of the electronic processing system. The gain of the amplifier 31 is set at the maximum value (K maximum) and the circuit 37 is adjusted to position the needle of the indicator 36 at half scale.

The analysis chamber is then filled with the gas mixture and $T_1$, $T_2$ and S are expressed as:

$T_{1\ M+P} = K(1 - a - b - mc)E$
$T_{2\ M+P} = Ks(1 - ka - kb - mb - mc)E$
$S_{M+P} = S_N - KmcE + Ks(ka + kb + mb + mc)E$

The last expression shows that the deviation of the indicator will be positive with respect to the indication corresponding to nitrogen if $Ks(ka + kb + mb + mc)E > KmcE$, i.e., if the opening s of the shutter is sufficiently large. The deviation will move further positive when the concentration $k$ of the gas to be measured increases. Consequently, as it is desired to have a positive deviation with the gas mixture, the shutter will be moved out of the beam if the deviation is negative so as to satisfy the above inequality. If no positive deviation can be obtained, the source 10 is moved so as to direct more energy into the second channel.

In order to cancel the effect of the parasitic gas, the analysis chamber is filled with the parasitic gas P; $T_1$, $T_2$ and $S_P$ are expressed as:

$T_{1P} = K(1 - a - b - mc)E$
$T_{2P} = Ks(1 - mb - mc)E$
$S_P = S_N - KmcE + Ks(mb + mc)E$

The last expression shows that $S_P$ will not be dependent on the concentration $m$ of the parasitic gas P if the opening of the shutter is such that $s = c/b + c$. The shutter is then moved into the path of the beam if $S_P > S_N$ (positive deviation) or out of the path if $S_P < S_N$ (negative deviation). No adjustment of the shutter is needed if $S_P = S_N$. When $S_P$ is different from $S_N$ the adjustment of the shutter, which is also called selectivity adjustment, is obtained by successive approximations. The analysis chamber is successively filled with nitrogen, then with the parasitic gas, then again with nitrogen and so on. The shutter 23 is moved (screw 24) when the analysis chamber is filled with the parasitic gas so as to obtain the same reading as that with nitrogen. It will be noted that, before the adjustment is completed, the needle of the indicator will move each time the analysis chamber is filled with nitrogen; the needle is then set back to half-scale by using the device 37.

When the selectivity adjustment is completed, the device 37 is adjusted to move the needle to the zero of the scale with the analysis chamber filled with nitrogen. The apparatus is calibrated by filling the analysis chamber with the gas mixture containing the expected maximum concentration of the gas to be measured, for example 1,000 ppm, and the gain of the amplifier 31 is adjusted to set the needle of the indicator at the maximum scale which corresponds for example to 2.5 mV.

The length of the analysis chamber is chosen in accordance with the expected range of concentration to be measured. However, when the concentrations are very low, it is no longer possible to increase the length of the analysis chamber as its overall size becomes excessive. The attenuation of the beam in the analysis chamber then becomes much smaller so that the difference between the signals corresponding to the two channels is also much smaller and, consequently, difficult to measure with accuracy (for example 50 microvolts on the 2.5 mV scale).

In order to have a higher ratio between the differential signal and the amplitude of the signals, the invention provides for partially reducing the modulation due to the filter 12 so as to read for example, 50 microvolts on a 0.1 mV scale instead of the 2.5 mV scale. For this purpose, the auxiliary tube 27 filled with inert gas is placed along the path of the first channel. As this tube allows the passage of a compensation beam coming from the filter 12, but not attenuated by the gas of the analysis chamber 18, the first channel transmits a larger infrared energy and the corresponding signal increases. The voltage provided by the device 37 must be increased to obtain the non-interference point and, consequently, the scale range will be decreased for example to 0.1 mV.

In some cases such as the analysis of propane in presence of methane, the influence of the parasitic gas whose absorption bands overlap partially the absorption band of the gas to be measured can be further reduced by partially filling the comparison filter 13 with the parasitic gas.

Figure 5:
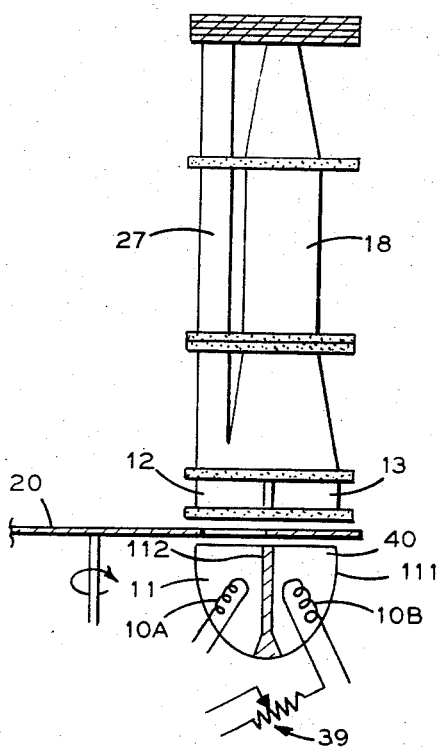

As already mentioned, it is possible to use a second source of infrared rays to illuminate the second channel, which allows to replace the mechanical attenuator or shutter 23 by an electrical attenuator comprised of a variable resistor in the supply circuit of the filament of the source. This embodiment is illustrated in FIG. 5 wherein the like reference numerals refer to like parts of FIG. 1. The parabolic mirror 11 is divided in two parts by an opaque wall 112. A source of infrared rays is placed in each part and is comprised of a filament 10A in the first channel and of a filament 10B in the second channel. A variable resistor 39 is connected in series in the supply circuit of the filament 10B and allows one to vary the infrared energy emitted by the filament.

Figure 6:
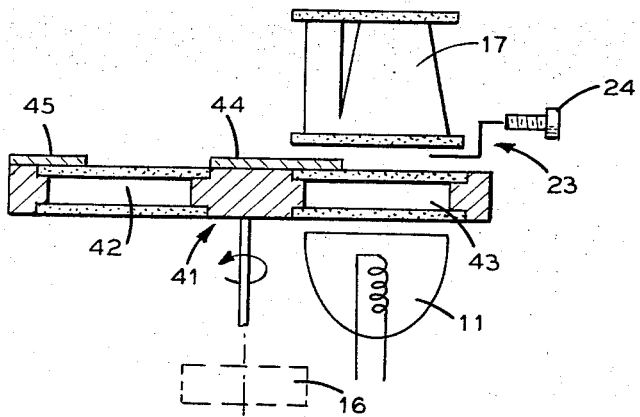
FIGS. 5, 6 and 7 illustrate other embodiments according to the present invention.

In another embodiment illustrated in FIG. 6, the static filters 12 and 13 of FIG. 1 as well as the rotating commutator 20 have been replaced by a rotating element 41 supporting the gaseous filter 42 and the comparison filter 43. A shutter 45 is associated with the gaseous filter 42 in order to eliminate the effect of the movable shutter 23 on the first channel. A shutter 44 is also provided with the comparison filter so as to prevent the beam of the second channel from reaching the auxiliary tube 27.

Likewise, the order of the elements involved in the transmission of the radiation between the source and the radiation detector can be modified without changing the response signal of the said detector for this radiation.

Figure 7:
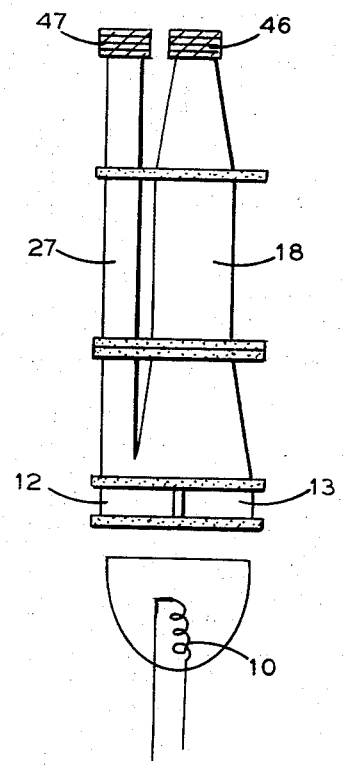

A further embodiment is illustrated in FIG. 7, said embodiment being similar to that described with reference to FIG. 1 except that two radiation detectors 46 and 47 are provided. The radiation detector 46 receives only the beam travelling through the analysis chamber 18 while the radiation detector 47 receives the beam passing through the auxiliary tube 27. The radiation detectors 46 and 47 provide signals in phase or in phase opposition according to the relative angular positions of their polarization axis. The sum of the output signals of the detectors is obtained by a differential amplifier when they are in phase opposition or by a summing amplifier when they are in phase.

The invention has been described in detail with reference to illustrative embodiments thereof but it will be understood that variations and modifications can be effected within the true spirit and scope of the invention as described hereinabove and as defined in the appended claims.

What is claimed is:

1. Gas analyzer of the infrared absorption type for measuring small concentrations of gas of interest in a gase mixture containing a parasitic gas which has absorption bands overlapping those of the gas of interest, comprising an analysis chamber; means for alternately and periodically directing into one end of the analysis chamber a first infrared beam which contains no energy at the wavelengths corresponding to the absorption bands of the gas of interest and a second infrared beam; an auxiliary tube filled with an inert gas vis-a-vis the infrared beam and placed along the analysis chamber so as to divert a portion of the first infrared beam, a movable shutter associated with said auxiliary tube for varying the amount of energy passing therethrough, a non-selective radiation detector disposed at the other end of the analysis chamber for providing signals proportional to the energies of the beams passing through the analysis chamber and the auxiliary tube; circuit means associated with the non-selective radiation detector for providing a signal representative of the difference between the energies of the first and second beams; and means for adjusting the intensity of the second beam so as to obtain the same signal when the analysis chamber is filled with either an inert gas or the parasitic gas, whereby the influence of the parasitic gas is eliminated when the analysis chamber is filled with the gas mixture to be analyzed.

2. A method of determining the concentraton of a gas M in a mixture consisting of the gas M and a parasitic gas P, wherein the two gases have overlapping regions of infrared absorption spectra, the method comprising the steps of filling a test chamber with a gas N which is optically inert in the absorption spectra of interest, which spectra include the overlapping regions;

irradiating the test chamber with infrared energy alternately passed through a cell which is filled with the gas N that is optically inert in the absorption spectra of interest and a cell filled with the gas M alone;

detecting and displaying the magnitude of the difference between levels of radiation passing through the test chamber, the magnitude thus displayed constituting a reference level;

filling the test chamber with the gas P;

irradiating the test chamber alternately through the cells;

adjusting the level of radiation passing through the optically inert gas cell in a direction to equalize the readings obtained in the steps of irradiating the test chamber when filled with the parasitic and optically inert gases, respectively;

repeating the steps of filling the test chamber alternately with the optically inert and parasitic gases, N and P, and of adjusting the displayed magnitude and level of radiation until the two readings are equal; and filling the test chamber with the gas mixture of M and P, repeating the step of irradiating the chamber through the cells and displaying the resulting difference in magnitudes as a measure of the concentration of gas M.

3. A method according to claim 2 which further includes, before the step of filling the test chamber with the gas mixture of M and P, the step of calibrating the display by filling the test chamber with the gas N;

adjusting the display to a zero reading;

filling the test chamber with a mixture of M and p wherein the gas M constitutes a known concentration equal to the maximum anticipated concentration; and adjusting the display to a predetermined maximum scale reading.

* * * * *